May 25, 1965  R. C. ZEIDLER ETAL  3,184,833
METHOD OF MAKING VANES FOR HYDRAULIC COUPLINGS
Original Filed Feb. 1, 1956  5 Sheets-Sheet 1
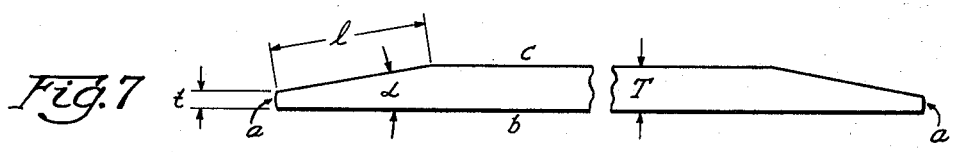
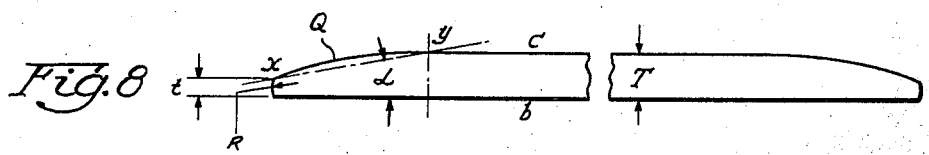
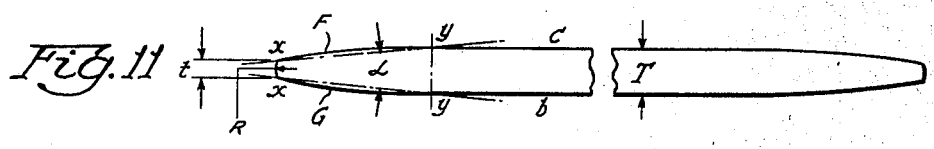
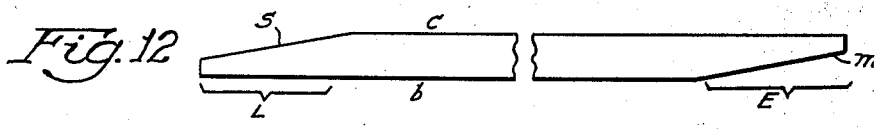
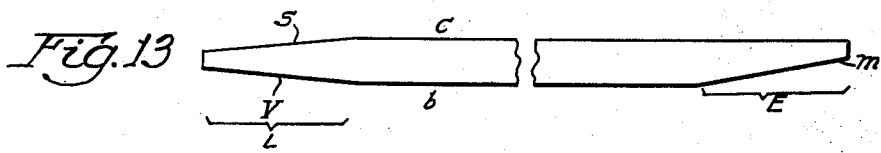
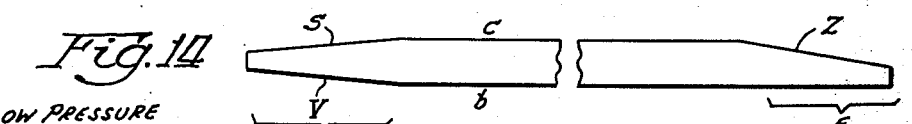
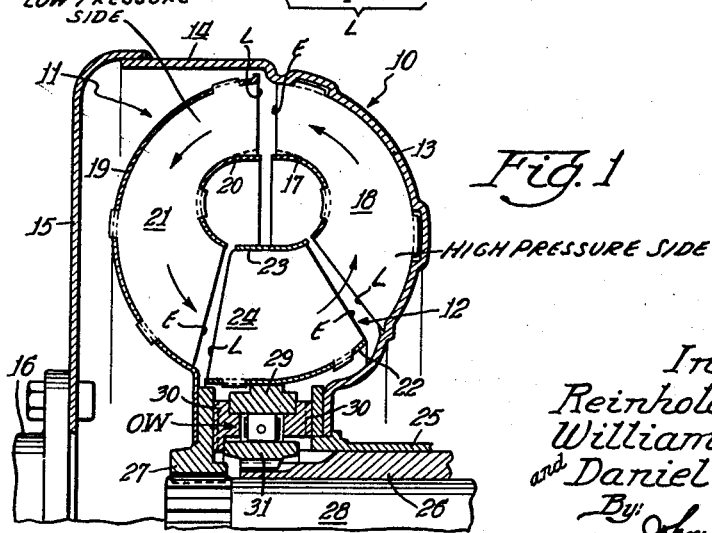
Inventors:
Reinhold C. Zeidler,
William A. Barnes
and Daniel W. Lysett
By: John W. Butcher Atty.

Fig.2

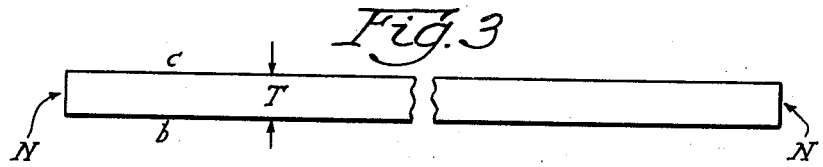
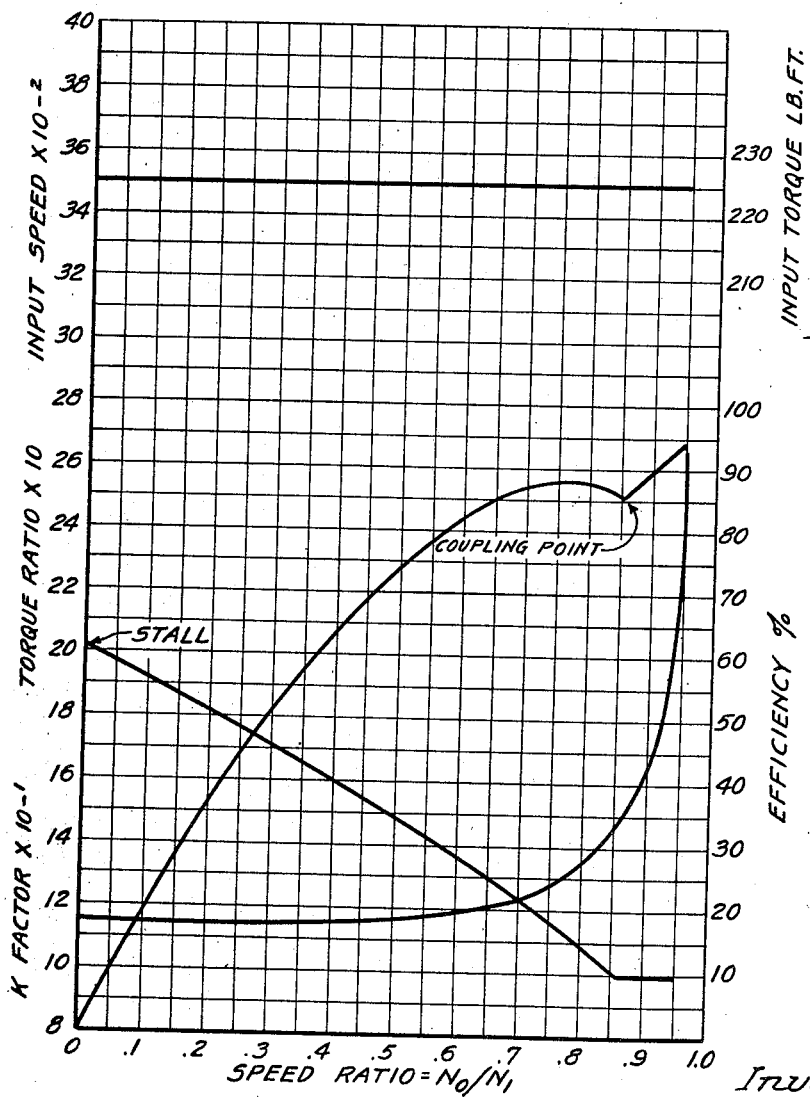

Inventors:
Reinhold C. Zeidler,
William A. Barnes
and Daniel W. Lysett
By: John W Butcher Atty.

United States Patent Office 3,184,833
Patented May 25, 1965

3,184,833
METHOD OF MAKING VANES FOR HYDRAULIC COUPLINGS
Reinhold C. Zeidler and William A. Barnes, Detroit, and Daniel W. Lysett, Birmingham, Mich., assignors to Borg-Warner Corporation, Chicago, Ill., a corporation of Illinois
Original application Feb. 1, 1956, Ser. No. 562,686, now Patent No. 2,989,004, dated June 20, 1961. Divided and this application Jan. 10, 1961, Ser. No. 81,866
3 Claims. (Cl. 29—156.8)

This application is a division of an earlier filed co-pending application entitled Hydraulic Couplings, filed on February 1, 1956, Serial No. 562,686, now U.S. Patent No. 2,989,004 issued on June 20, 1961.

This invention relates to hydrodynamic couplings and more particularly to such couplings of the type having relatively rotatable members providing a closed fluid circuit and utilizing thin metal vanes to control the flow of fluid.

Hydrodynamic couplings employ vanes in the different relatively rotatable vaned members comprising an impeller or pump, a turbine or runner, and, in the torque conversion type, a stator or reactor, to control the flow of fluid in a toroidal fluid circuit formed by the members, the vanes being formed, for example, of thin sheet metal stampings. It is desirable to use thin sheet metal vanes for hydrodynamic couplings of the torque conversion type, or hydraulic torque converters, as these vanes permit the largest possible number of closely spaced vanes to be used in the vaned members, which allows the couplings to develop practically all of the theoretical maximum head of the operating fluid circulating in the couplings while insuring the correct uniform control and guidance of the fluid flow through the conventional toroidal path provided by the vaned elements of the coupling. A further feature is that thin metal vanes are of light-weight and are readily formed as stampings having the desired curvatures for controlling the fluid flow for torque multiplication. In hydraulic torque converters, each of the vaned members usually comprise curved thin metal vanes extending between a shell or supporting member and a core ring, the vanes being secured thereto, for example, by welding or mechanical inter-locking connections, to provide fluid passages in the members.

In the operation of such hydraulic torque converters, two problems have been bothersome, namely, an annoying whistling sound or noise objectionable to the operator of machines, such as automobiles, embodying hydraulic torque converter transmissions and secondly the inability to obtain the efficiency indicated by vane design calculations. An analysis of the noise has been identified as being of two types attributable to cavitation and whistle. Concerning the cavitation noises, it has been found, in the operation of hydraulic torque converters, the thin metal vanes are subjected to shock from the flowing fluid during certain stages of torque multiplication, when the fluid flowing from the passages of one of the vane members encounters the vanes of another vane member at an awkward angle producing a churning action of the fluid and decrease in fluid velocity and this hydraulic phenomenon, or cavitation, is caused by the local vaporization of a liquid because of local pressure reductions due to dynamic action and is characterized by the formation of vapor pockets in the interior or on the boundries of a rapidly moving stream of fluid. This problem has been greatly alleviated by considerably increasing the pounds per square inch of the fluid pressure in the torque converter by a pump circulating the fluid through the torque converter which eliminates the cavitation noise as far as the car operator is concerned. The whistling problem appears to result from a disturbance in the flow of the fluid at the leading and trailing edges of the vanes and it has been determined that the whistling sound was increased slightly with the change in higher pressure of fluid in the torque converter and, for example, becomes evident at around 800 or 1000 engine. r.p.m. when a start is made from a standing position of the car. This whistling noise is of short duration and varies in intensity with different torque converters and frequently is shrill and of an intensity to become very annoying to the operator of the automobile.

The object of the invention is to provide a method of making vanes for hydraulic couplings effective to eliminate noises and to substantially increase the performance of the fluid couplings during operation of the couplings.

The invention consists of the novel constructions arrangements and methods to be hereinafter described and claimed for carrying out the above stated objects and such other objects as will appear from the following description of certain preferred embodiments illustrated with reference to the accompanying drawings; wherein:

FIGURE 1 is a longitudinal section through a hydraulic torque converter including pump, turbine, and stator members having vanes illustrating a preferred embodiment of the invention.

FIGURE 2 is a diagrammatic illustration of the pump, turbine and reaction member vanes of the torque converter of FIGURE 1 and showing the curvatures thereof along the middle stream line or main flow line with a vectorial representation showing the relative fluid flow angles at stall and during different portions of the torque-converting range and the coupling range of the torque converter;

FIGURE 3 is a sectional view through the radially central portion of any of the bladed elements of a torque converter looking inwardly toward the converter center showing a vane having leading and trailing edges formed in accordance with prior art practice, a substantial portion of the vane being broken away to more clearly illustrate the leading and trailing edge portions of the vane;

FIGURE 4 is a graph illustrating the performance characteristics of the torque converter having pump, turbine and stator vanes provided with the curvatures of FIGURE 2 and with leading and trailing edge portions of the vanes formed as shown in FIGURE 3;

FIGURE 7 is a view of a vane similar to FIGURE 5 illustrating a modification of the vane shown in FIGURE 5;

FIGURE 8 is a view similar to FIGURE 5 illustrating another modification of the vane shown in FIGURE 5;

FIGURE 11 is a view similar to FIGURE 5 of a vane illustrating a modification of the vane shown in FIGURE 9; and FIGURES 12 to 14, inclusive, are views similar to FIGURE 5 which illustrate still further and different vanes embodying the invention.

Figure 5:
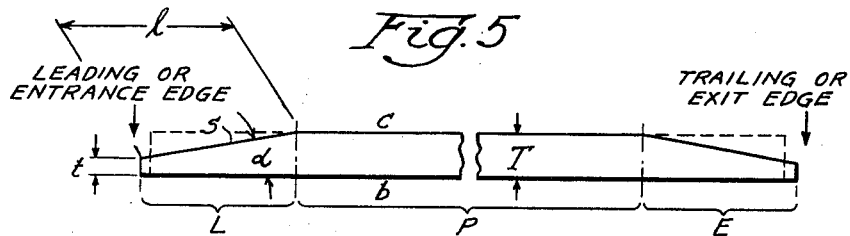
FIGURE 5 is a view similar to FIGURE 3 showing a vane having its leading and trailing edge portions formed in accordance with a preferred embodiment of the invention, a substantial portion of the central region of the vane having been removed to more clearly illustrate the leading and trailing edge portions of the vane.

The drawings are to be understood to be more or less of a schematic character for the purpose of disclosing typical or preferred forms of the improvements which are contemplated herein.

Referring now to FIGURE 1 for a detailed description of the hydrodynamic coupling of the torque converting type as shown, the coupling comprises a vaned element or a pump or impeller 10, a vaned element in the form of a turbine or runner 11, and a vaned reaction element or stator indicated at 12. The left side in this figure faces the front of the vehicle in which the torque converter is disposed and the impeller, turbine and stator—when rotating—turn in a clockwise direction when viewed from the front of the vehicle in any normal automotive installation. In this application it is assumed that the converter is disposed in such a normal automotive installation. The impeller 10 comprises a semi-toroidal shell 13 having a flange 14 at its outer edge, the flange 14 being secured to a driving plate 15 connected to an engine-driven shaft 16. The impeller further comprises a core ring 17 and vanes 18 formed of a thin sheet metal and extending between the core ring 17 and shell 13, the vanes 18 having a plurality of tabs on their outer curved margin received within slots in the shell 13 as clearly shown in FIGURE 1 and the inner arcuate margin of each vane is provided with a tab which extends through the core ring 17 and overlaps and engages the inner surface thereof. The turbine 11 is also provided with a semi-toroidal shell 19 and core ring 20, and a plurality of vanes 21 extending between and having tabs on each of their outer and inner arcuate margins receivable within slots in the shell 19 and the core ring 20 to maintain the shell, core ring and vanes in assembly. The stator 12 comprises an annular shell 22 and a core ring 23, with a plurality of vanes indicated at 24 extending between the shell 22 and core ring 23, the vanes 24 having tabs around and received within slots in the annular member 22.

Hub 25 of the impeller is rotatably mounted on a stationary cylindrical sleeve 26. The turbine 11 has a hub 27 splined to the shaft 28 extending through the sleeve 26. The stator 12 has a hub 29 rotatably mounted on spaced annular bearing members 30 between the hub 29 and a collar 31, splined to the stationary sleeve 26, a one-way brake indicated at OW.

The hydraulic torque converter functions to multiply torque between the engine-driven shaft 16 and the driven shaft 28 connected to the turbine 11, the vanes of the impeller 10 imparting energy to a body of fluid circulating, as indicated by the arrows, in a toroidal path within the torque converter, the turbine 11 receiving energy from the fluid, and the stator 12 being held from rotation by the one-way brake OW to provide the necessary reaction for multiplication of torque by the converter. As is well-known in the art, changes in the direction of the fluid flowing from the turbine to the stator during decreasing torque multiplication of the torque converter will eventually effect rotation of the stator with the impeller and turbine, i.e. upon the fluid being directed against the backs of the vanes of the stator, the one-way brake will release the stator for rotation.

The component parts of the turbine, namely, the vanes 21, the core ring 20 and the shell 19 are formed of thin sheet metal, and this is also true of the core ring 17 and vanes 18 of the impeller, the shell 13 of the impeller being formed of heavy sheet metal stamped to provide the toroidal configuration shown. The stator 12 has its vanes 24, the annular member 22 and core ring 23 formed of sheet metal.

Figure 2:
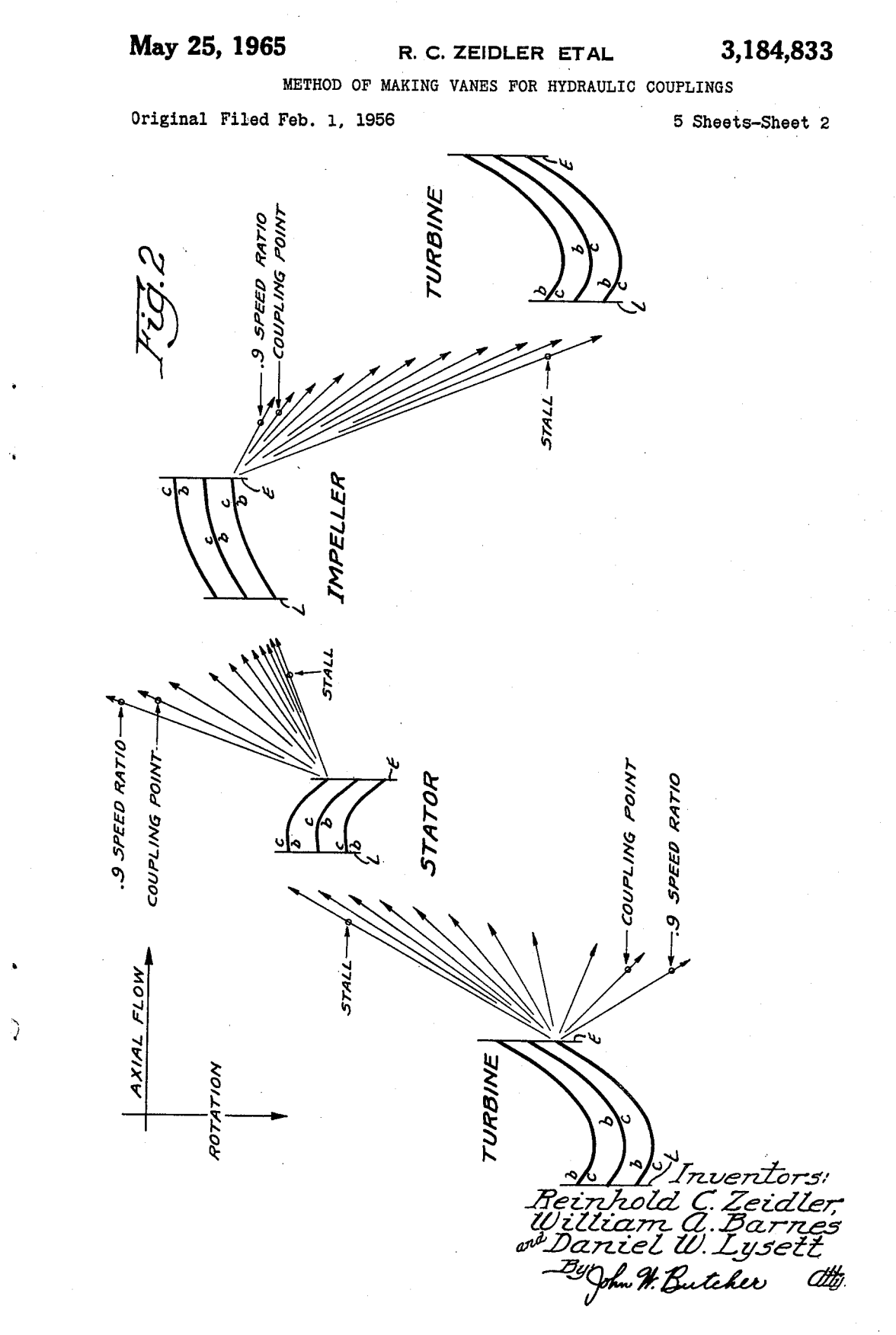

For the purpose of a clear understanding of the invention, reference is made to FIGURE 2 illustrating a typical example of fluid flow conditions between the impeller, turbine, and stator vaned elements of the hydraulic torque converter. FIGURE 2 diagrammatically illustrates the pump, turbine and reaction element vanes showing the curvatures along the middle stream line or the main flow line and illustrating pictorially the changing angles of fluid flow from one to the other of the vaned elements or members and showing the relative fluid flow angles at stall and during different portions of the torque-converting range and the coupling range of the pump, turbine and reaction element vanes shown in FIGURE 1. In the operation of the torque converter, the fluid flows in a circuitous path from the impeller toward the turbine which in turn directs the fluid towards the stator which causes the fluid to flow into the impeller in the direction of the arrows, as indicated in FIGURE 1 to provide different torque multiplication ratios varying from the largest torque multiplication ratio at the time the turbine is standing still or rotating slowly up to the coupling point of the torque converter when the otherwise stationary stator rotates and the torque converter then operates as a fluid coupling at a substantially one-to-one ratio. In FIGURE 2, the direction of the fluid flow from one vaned element to the other is indicated as the "Stall" condition and affords maximum torque multiplication of the hydraulic torque converter and it will be seen that the angles of the fluid flow from one vaned element to the next adjacent vane element changes as indicated by the arrows up to and including the "Coupling Point" when the fluid strikes the backs of the vanes of the stator to cause the one-way brake OW to release so that the stator rotates with the impeller and turbine to provide a substantially one-to-one ratio. As the performance characteristics of a torque converter are enhanced by the smooth flow of the fluid through and between and engaging the vanes of the vaned elements, it is of primary importance that any churning action or disturbance in the flow of the fluid into and through the passages of the vaned elements should be avoided. In addition, this churning action or disturbance in the flow of the fluid may cause undesirable noise objectionable to the operator of the machine, such as an automobile, in which the hydraulic torque converter may be used. It has been found that where vanes, such as those shown in FIGURE 3, are used in all the vaned elements or either the impeller, turbine and stator of a torque converter, a high shrill whistling sound or noise often results from a disturbance in the flow of the fluid at the leading edges of the vanes by the fluid flowing at such an angle from one of the vaned elements so as to strike the blunt end indicated at N in FIGURE 3 at the leading edge of the vane and also, after the fluid flows along the vane, the resultant discharge at another angle from the trailing edge of the vane effects a further disturbance of the flow of the fluid. It has been determined that such disturbances produce a whistling sound which may vary in intensity and frequently be in the form of a high pitched shrill whistle which is annoying to the operator of the automobile.

The present invention is directed to the formation of vanes of thin sheet metal of hydraulic fluid couplings and torque converters having the leading and trailing edge portions of the vanes formed in a manner to eliminate or substantially minimize the disturbance of the flow of the fluid at the leading and trailing edge portions of the vanes for the purpose of obtaining a substantial increase in the performance of the torque converter as well as to completely eliminate, so far as the operator is concerned, the whistling sound or noise, during operation of the torque converter. For this purpose, in the preferred embodiment of the invention, the vanes of the impeller, turbine and stator, prior to their final forming are chamfered in their flat state and are formed as shown in FIGURE 5 to substantially increase the performance of the torque converter while eliminating any whistling sound, in the operation of the torque converter.

More particularly, the vanes of the impeller, turbine and stator are each formed of thin sheet metal, such as steel stampings, having their liquid entrance and exit portions provided with a chamfer S extending to their leading and trailing edges L and E so as to produce a long chamfer almost knife edge sharp on the low pressure side of the vane indicated at C, b indicating the high pressure side of the vane. It will be observed that each of the vanes is of thin sheet metal and are stamped from a large sheet of uniform thickness. The forming of the trailing and leading edge portions of the vane as shown in FIGURE 5, provides chamfers S inclined at angles from the parallel flat sides or planes of the body portion P of the vane with the chamfer S gradually decreasing in thickness from the body portion P toward the particular edge of the vane.

The best method for the forming of the vanes to produce the chamfered surfaces S on the leading and trailing edge portions of the vanes is to initially utilize a flat sheet of metal and to stamp the vanes from this sheet of metal; secondly, to coin the two trailing and leading edge portions of the individual vanes to produce the chamfers S; and thirdly, to position the flat vanes in a die to form the vanes with the proper curvatures for obtaining the desired torque multiplication ratio characteristics of the vanes. The coining operation increases the length of the vane approximately .030 in a vane having a thickness of .036, FIGURE 5 illustrating, in dotted lines, the leading and trailing edges of the blank vane before coining and in solid lines, the shape of the edges after the coining operation has been completed. It has been found that where the sheet metal is a hard material, the leading and trailing edges will finish up with a relatively square edge, as shown in FIGURE 5, while the softer materials will tend to bulge the end of the vane to form a desirable crown or radius, as shown at a in FIGURE 7. Accordingly, the example of the vane shown in FIGURE 5 has been formed of a relatively hard material and it is noted that the edge of the vane is approximately square.

Figure 9:
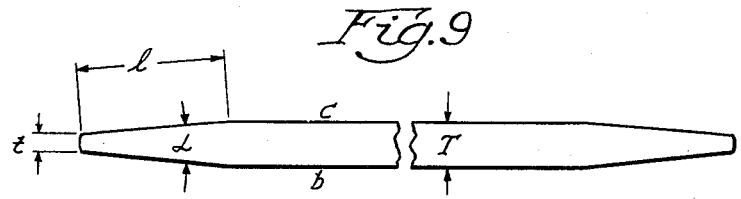
FIGURE 9 is a view similar to FIGURE 5 of a vane illustrating another embodiment of the invention.

Results of experimental tests indicate that the thickness $t$ of the chamfered leading and trailing edge portions can satisfactorily be made to between .010 inch and .020 inch when the thickness of the body of the vane indicated at T varies between .036 inch and .050 inch. This comparison of the thickness of the vane as indicated at T and the thickness at the chamfered edge of the vane indicated at $t$ establishes a ratio between the nominal thickness of the material as indicated at T and the thickness of the material at the chamfered edge as indicated at $t$ and which is effective to insure the correct calculation of the thickness of the chamfered edge portions with respect to the nominal thickness of the material as indicated at T in the design of all torque converters utilizing sheet metal vanes. This ratio may be arbitrarily called a sharpness ratio and is equal to T. It has been found that this ratio will vary from 1.5 to 1 to about 9.0 to 1 depending on the initial thickness of metal and the reduction in the thickness at the edge. The length of the chamfer and the reduction in thickness determines the angle of the chamfer. If there is a chamfer on only one side of the vane as shown in FIGURE 5, the angle alpha has the sine of $$\frac{T-t}{1}$$

whereas, if the chamfer is applied to both sides of the vane as will be later described and as shown in FIGURES 9 and 11, the angle alpha is equal to 2 times (×) the sine of $$\frac{T-t}{2 \times 1}$$

On the basis of the above formulas, the chamfered portions of the vanes have varied all the way from about 5 to 30° for the included angle. In experimental testing of vanes, the angle of the chamfer has been around 10°, but it has been proven that this angle could vary from 6° to 14° depending upon the sharpness ratio and the thickness of the stock, with this variation in the degree of angularity being considered to be satisfactory for a manufacturing tolerance.

In forming the chamfers on the vanes experimentally, the chamfers have been milled on the vanes. This is an expensive operation, although providing excellent results. Forming the chamfers by coining the leading and trailing edge portions of the vanes is inexpensive in production and is entirely satisfactory in providing the desired results.

Figure 6:
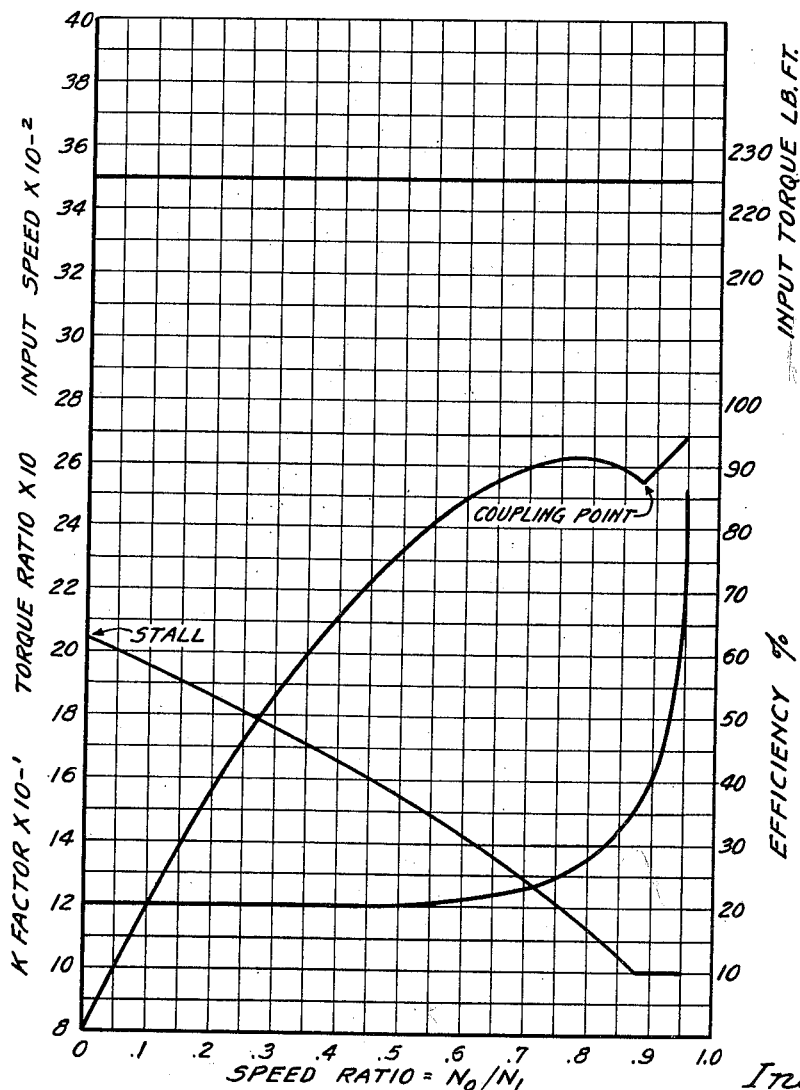
FIGURE 6 is a graph illustrating the performance characteristics of a torque converter having the pump, turbine and stator vanes provided with the curvatures of FIGURE 2 and with the leading and trailing edge portions of the vanes formed in the manner as shown in FIGURE 5.

Referring to the graphs illustrated in FIGURES 4 and 6, the graph of FIGURE 4 illustrates the characteristics of a torque converter having vanes of uniform thickness and including the blunt leading and trailing edges as indicated at N in FIGURE 3 in accordance with conventional practice in the hydraulic torque converter art. The graph of FIGURE 6 illustrates a hydraulic torque converter having vanes identical in curvature to that of the torque converter having the characteristics illustrated in FIGURE 4, however, with each vane being chamfered at the leading and trailing edge portions L and E thereof on the low pressure side c from the thickness of .036 inch uniform dimension of the body portion P of the vane and tapering at the leading and trailing ends of the vane as indicated in FIGURE 5. A torque converter having vanes with chamfered leading and trailing edge portions on the low pressure side was found to have the performance characteristics reflected in FIGURE 6 and to be effective to eliminate whistling noise or sound in the torque converter at all stages of the torque multiplication and coupling ranges of the torque converter during the operation of the torque converter. It will be apparent from a comparison of FIGURES 4 and 6 that the efficiency characteristics of the torque converter of FIGURE 6 was raised from between 88 and 89% to 91% in comparison to the torque converter of FIGURE 4. Also, FIGURE 6 shows that the torque ratio at stall was increased in comparison to the torque ratio at stall of the torque converter of FIGURE 4 and that the coupling point was extended by .86 to .88. It will thus become apparent that the chamfers on the vanes in accordance with the above description and as illustrated in FIGURE 5 is effective to not only eliminate whistling noise during the operation of the torque converter but also to provide substantial increases in the performance characteristics of the torque converter as reflected by a comparison of the graphs of FIGURES 4 and 6.

While it is believed that the chamfer on the low pressure side c of the vane as indicated in FIGURE 5 is desirable to obtain optimum results, experiments appear to indicate that little difference in results are obtained between chamfers on the low pressure side of the vane as shown in FIGURE 5 in comparison to chamfers on both the low and high pressure side as shown in FIGURE 9. However, evidence has been determined from these experiments that various configurations of chamfers at the leading and trailing edge portions of the vanes may show improved results, for example, such as the chamfers on these portions of the vanes as shown in FIGURES 8 and 11, wherein each tapered surface may be slightly crowned or otherwise shaped to improve the flow of the fluid instead of being flat as shown in FIGURES 5, 7, and 9. Referring to FIGURE 8, it will be seen that the chamfer or tapered surface Q is slightly crowned which is believed to improve the flow of the fluid along the vane and, in FIGURE 11, the low pressure side c and the high pressure side b provide crowned chamfered surface converging toward the ends of the vane. It is believed a satisfactory manner of denoting the angle for this character of the tapered surfaces shown in FIGURES 8 and 11, is to use a reference line through intersecting points with one end of the line passing through the point x representing the intersection of the crowned surface and the radius of edge caused by displacement of metal, while the other end would pass through the point y representing the intersection between the crowned surface and the nominal flat surface of the body of the vane. The formulas for determining the included angle would be identical to the formulas referred to above in determining the included angles of FIGURES 5 and 7.

Figure 10:
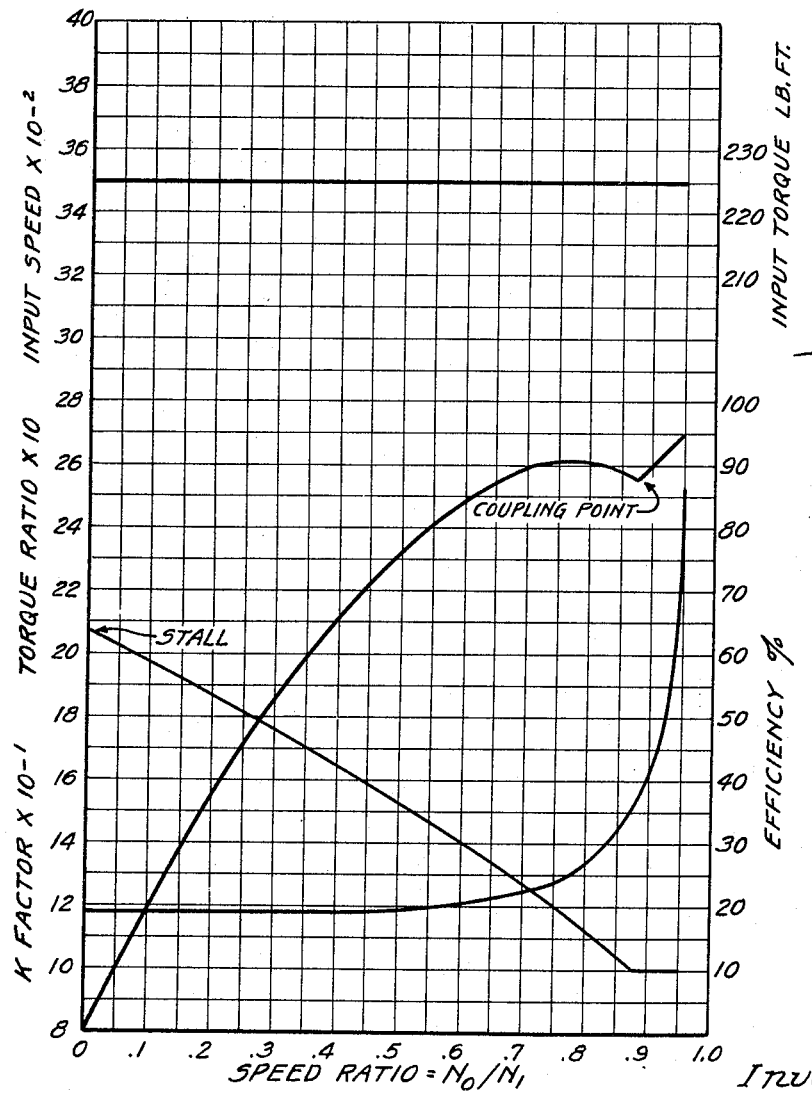
FIGURE 10 is a graph illustrating the performance characteristics of a torque converter having the pump, turbine and stator vanes formed in a manner illustrated in FIGURE 9.

FIGURE 10 is a graph illustrating the performance characteristics of a hydraulic torque converter having curvatures of the vanes identical with that of the torque converter having the performance characteristics indicated in FIGURE 4, but the torque converter represented by the graph of FIGURE 10 has the entrance and exit portions provided with chamfered surfaces on both the low and high pressure sides as shown in FIGURE 9. A comparison of FIGURES 4 and 10 clearly reveals that the torque multiplication ratio at stall of the torque converter of FIGURE 10 has been considerably increased, the coupling point having been extended from approximately .86 to .88 and the efficiency raised from 88% to to 91%, thus clearly illustrating that the torque converter having chamfered surfaces on its high and low pressure sides at its entrance and exit portions affords a substantial increase in the desirable performance characteristics of a torque converter over that of the hydraulic torque converter with the entrance and exit portions being of the same uniform thickness as the body portion of the vanes as shown in FIGURE 3 and embodied in a torque converter graphically illustrated in FIGURE 4.

FIGURE 12 illustrates a modification of the vanes shown in FIGURE 5, wherein the leading edge portion L of the vane is chamfered on its low pressure side c with the chamfer or inclined surface S and the trailing edge portion E is provided with a chamfer m on the high pressure side.

FIGURE 13 illustrates a further modification of the vane shown in FIGURE 9, wherein the leading edge portion of the vane is formed with chamfered surfaces S and V on opposite sides of the leading edge L thereof, namely, on its low pressure and high pressure sides c and b respectively and the trailing edge portion E of the vane is provided with a tapered surface m on its high pressure side.

FIGURE 14 illustrates a still further modification of the vane shown in FIGURE 9 and wherein the leading edge portion L of the vane is provided with chamfered surfaces S and V on the low and high pressure sides c and b thereof respectively and the trailing edge portion E is provided with an inclined surface Z on the low pressure side thereof.

It is believed that tests will clearly determine which particular type of chamfer on either or both the high, low pressure sides of the vanes for a particular vane is best suited for a particular vane and particular torque converter. Factors in determining which of the different chamfered surfaces illustrated in FIGURES 7, 8, 9, 11 and 12 to 14, inclusive, will be most useful and the application of where to employ the chamfer or chamfers on the vane, as reflected in these views, will be the design point, the vane angles at the leading and trailing edge portions of the entrance and exit of the vanes, and the kind of performance desired from a torque converter. For example, tests may prove that for a given design of converter the best results are obtained when only the low pressure side of each vane is provided with chamfers at the leading and trailing edge portions thereof as shown in FIGURE 5 but for another design of converter the optimum results may be obtained when both the low pressure and high pressure sides at the leading edge portion of the vanes are provided with chamfered surfaces and a chamfered surface is provided at the trailing edge only on the high pressure side b as shown in FIGURE 13. These tests should indicate and reveal the combinations that will be most beneficial.

It is important that in the design of stamped steel vanes having the chamfered surfaces as reflected in the figures of the drawings that the sharpness ratio be calculated as the ratio of the thickness of the body of the vane to the thickness of the vane at the chamfered edge thereof and it is believed that the most useable ratios lie within the limits of 1.5 to 9.0 to 1. In combination with this sharpness ratio, it will be necessary to consider the included angle of the tapered surfaces comprising the chamfered portions of the vane and it is believed that the most beneficial angles will lie between the limits of 5° and 30°. It will be apparent that the tapered surfaces of the vanes, and defined by the chamfers, need not be flat as shown in FIGURES 7 and 9, for example, but may be advantageously crowned as shown in FIGURES 8 and 11. It will be noted that the chamfered edges of the vanes as shown in FIGURES 5, 7, 8, 9 and 11 to 14, inclusively, and indicated at a in FIGURE 7, are caused by displacement of the metal and which edges may automatically come out relatively square or with appreciable radius because of being influenced by the hardness and type of material used. It is within the contemplation of the invention that a definite radius is desirable and which may be able to be produced at will. It may also be desirable and is within the contemplation of the invention that more than one type of chamfered surface may be employed in a single blade as reflected in the various views of the drawings and that several variations of the chamfered surface may be employed in the vanes provided in a single torque converter.

It will also be apparent that, in providing a solution for the whistling noises resulting from a disturbance in the flow of the fluid at the leading and trailing edges of the vanes during operation of the torque converter, the elimination or substantial reduction of the disturbance in the flow of the fluid at these edges of the vanes has also been effective in eliminating any disturbance to the fluid flow at these edges of the vanes to substantially increase the efficiency indicated by design calculations of the vanes.

Where the term "coining" is used in this application, it refers to cold working of metal under pressure to alter its shape.

While this invention has been described in detail with respect to certain forms of embodiments, it will be apparent to persons skilled in the art, after understanding the improvements, that various changes and modifications therein may be made without departing from the spirit or scope thereof. It is aimed in the appended claims to cover all such changes and modifications.

We claim:
1. The method of making a liquid flow-controlling vane comprising the steps of providing a flat sheet of thin metal having substantially uniform thickness; stamping the sheet with a die to provide a vane having liquid entrance and exit portions with two spaced straight edges; and coining said portions of the vane to provide surfaces on said portions inclined at an angle to the plane of the vane and terminating at said edges thereof; and bending said vane to a predetermined desired curvature.

2. The method of making a liquid flow-controlling vane comprising the steps of providing a flat sheet of thin metal having a substantially uniform thickness; stamping said sheet to provide a vane having a liquid entrance portion and a liquid exit portion and having two spaced straight edges; removing material from said liquid entrance portion and from said liquid exit portion of said vane to provide surfaces on said liquid entrance portion and said liquid exit portion, said surfaces being inclined at an angle to the plane of the vane and terminating at said edges thereof; and forming said vane to a predetermined desired curvature.

3. The method of making a liquid flow-controlling vane comprising the steps of providing a flat sheet of thin metal having a substantially uniform thickness; stamping said sheet to provide a vane having a liquid entrance portion and a liquid exit portion and having two spaced straight edges; milling material from said liquid entrance portion and from said liquid exit portion of said vane to provide surfaces on said liquid entrance portion and said liquid exit portion, said surfaces being inclined at an angle to the plane of the vane and terminating at said edges thereof; and forming said vane to a predetermined desired curvature.

References Cited by the Examiner

UNITED STATES PATENTS

| | | | |
|---|---|---|---|
| 911,492 | 2/09 | Goldsborough | 29—156.8 |
| 1,773,349 | 8/30 | Bothezat. | |
| 2,351,517 | 6/44 | Jandasek. | |
| 2,357,295 | 9/44 | Thompson | 29—156.8 |
| 2,435,236 | 2/48 | Redding | 230—120 |
| 2,680,286 | 6/54 | Willgoos | 29—156.8 |
| 2,721,693 | 10/55 | Fabri | 230—120 |
| 2,736,171 | 2/56 | Stalker | 103—115 |
| 2,752,859 | 7/56 | Zeidler | 29—156.8 |
| 2,799,918 | 7/57 | Goldthwaite et al. | 29—156.8 |

FOREIGN PATENTS 770,787  3/57  Great Britain.

WHITMORE A. WILTZ, Primary Examiner.

NEDWIN BERGER, HYLAND BIZOT, Examiners.